United States Patent

[11] 3,624,830

| [72] | Inventors | Donald J. Stehower;<br>Lloyd M. Koops, both of Hamilton, Mich. |
|---|---|---|
| [21] | Appl. No. | 880,766 |
| [22] | Filed | Nov. 28, 1969 |
| [45] | Patented | Nov. 30, 1971 |
| [73] | Assignee | HI-Life Packing Company<br>Chicago, Ill. |

[54] FOOD-PROCESSING APPARATUS
11 Claims, 8 Drawing Figs.

[52] U.S. Cl. .................................................. 99/235 R,
                                                   99/238 PD
[51] Int. Cl. .................................................. A23k 1/00
[50] Field of Search .......................................... 99/235 R,
        237, 238 PD; 107/14, 14 A, 14 CA, 14 C, 14 D, 1
                                                             D

[56] References Cited
UNITED STATES PATENTS
| 1,825,475 | 9/1931 | Pfeiffer .................. | 99/235 R UX |
|---|---|---|---|
| 2,144,055 | 1/1939 | Hall ........................ | 107/14 CA |
| 2,193,147 | 3/1940 | Stricker ................... | 107/1 D |
| 2,350,643 | 6/1944 | Schwebke et al. ..... | 99/238 PD |
| 2,915,957 | 12/1959 | Bowman ................. | 99/238 PD |
| 2,963,995 | 12/1960 | Brudi ...................... | 107/14 A |
| 3,190,210 | 6/1965 | McComb et al. ...... | 107/14 CA |
| 3,320,905 | 5/1967 | Urschel ................... | 99/235 R |

*Primary Examiner*—Walter A. Scheel
*Assistant Examiner*—Arthur O. Henderson
*Attorney*—Norman H. Gerlach

ABSTRACT: A food-processing apparatus, especially useful in the preparation of dog food of the chunk or kibbled variety. A rotary cutter assembly coacts with a stationary perforated extrusion plate to shear extruded material therefrom and by way of a novel mounting means is capable of adjustment toward and away from the extrusion plate without shutting down or stopping the operation of the apparatus thus compensating for wear of the blades of the cutter assembly.

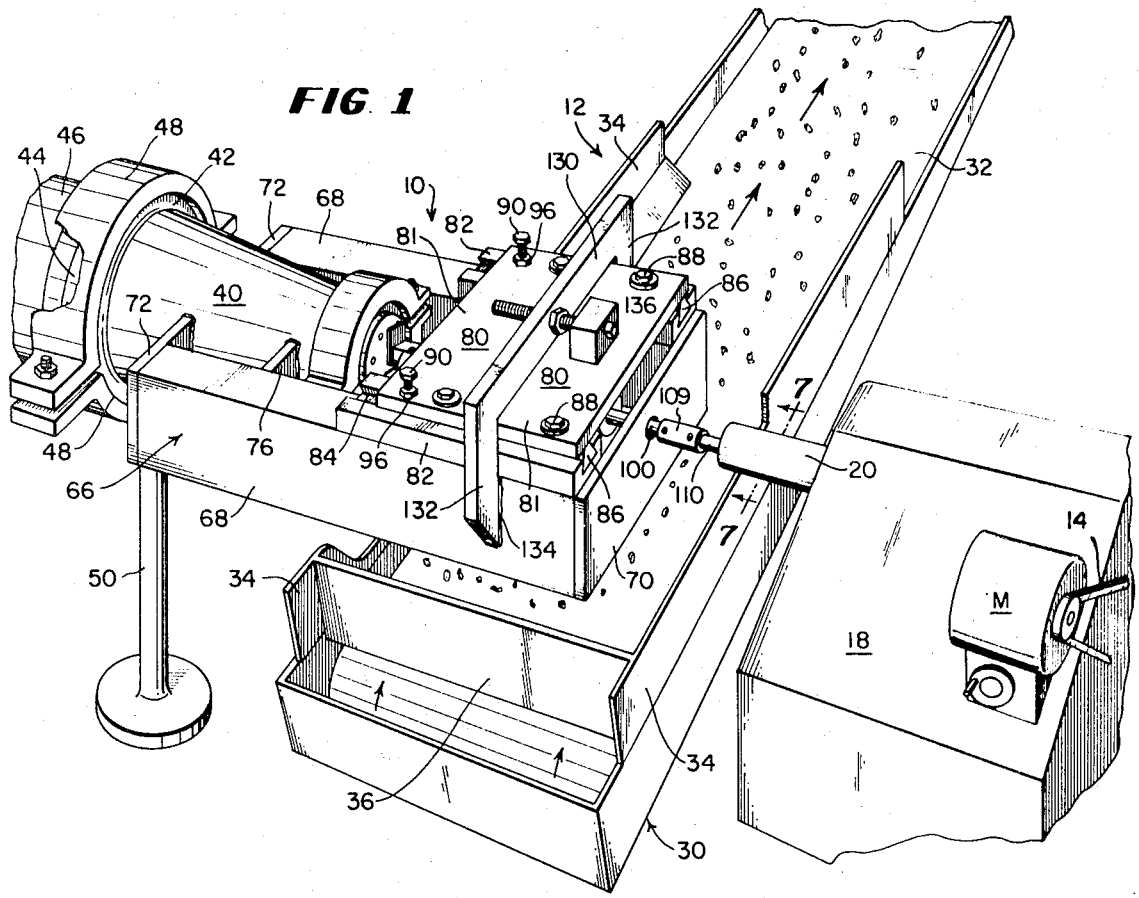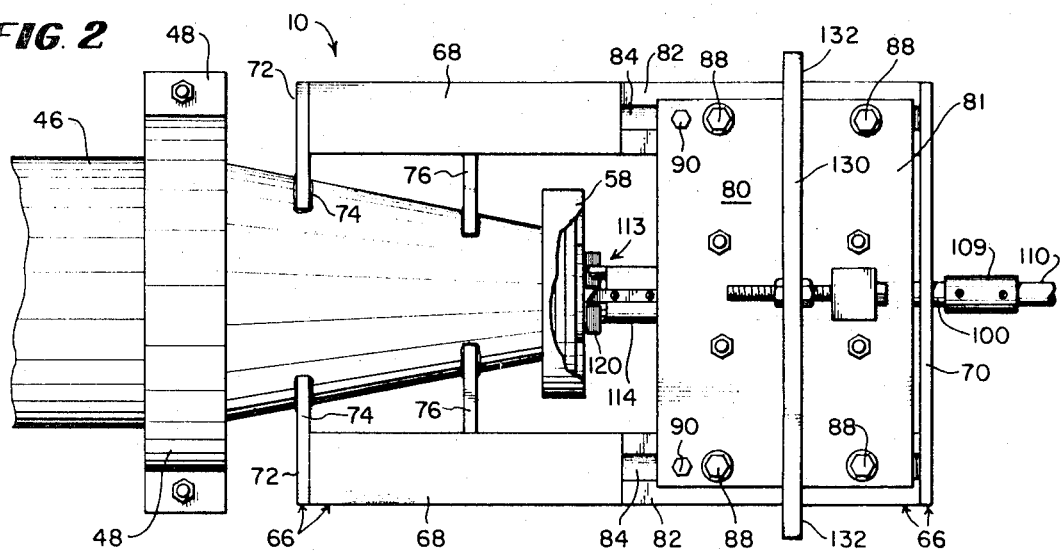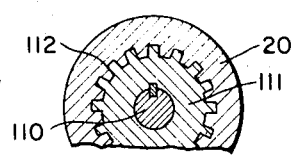

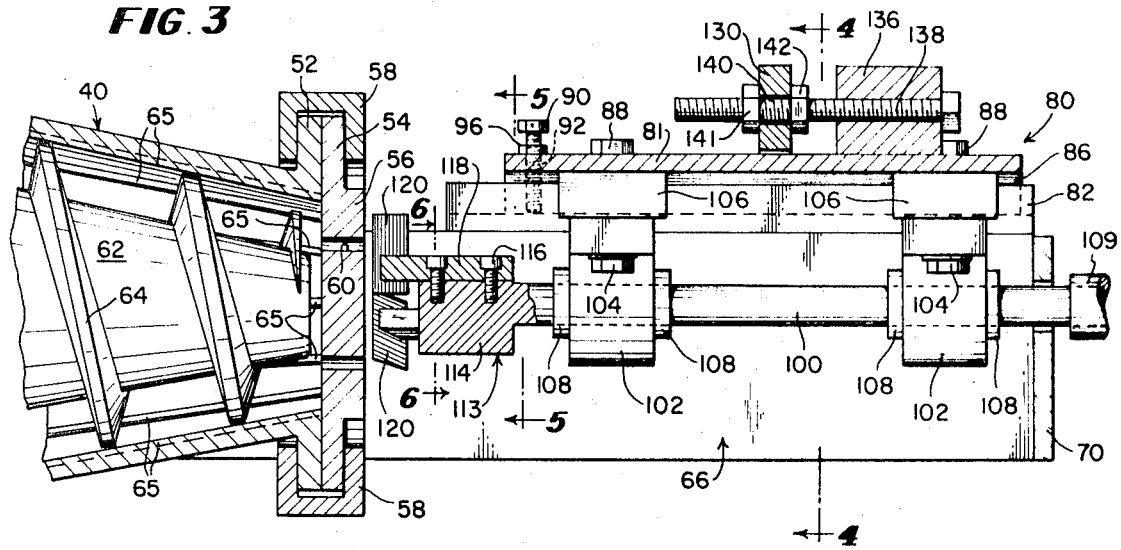
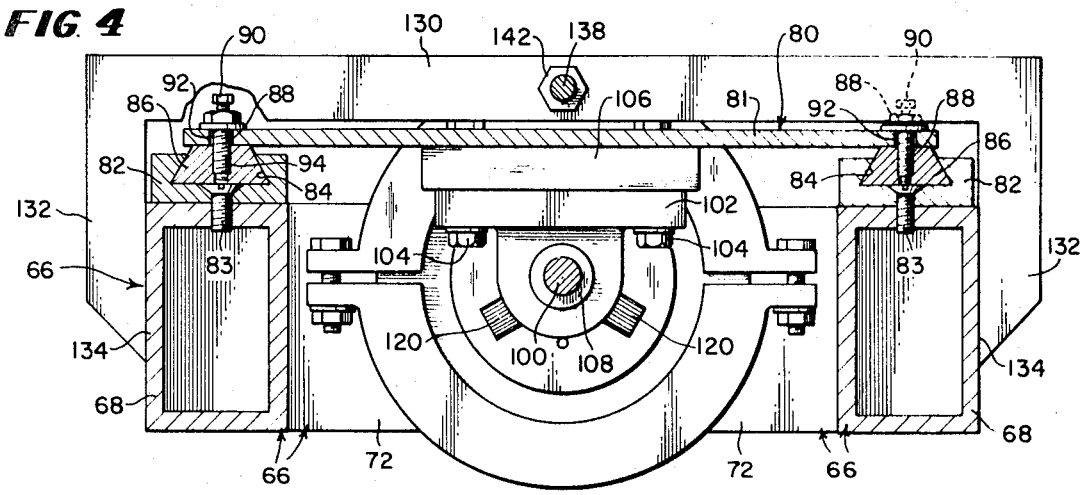
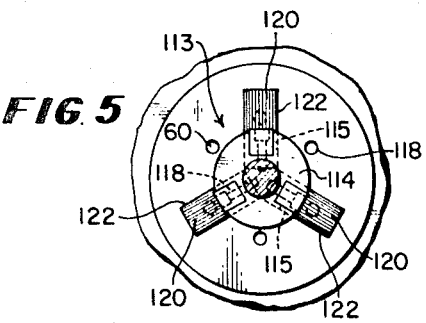
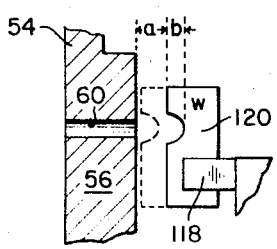

FOOD-PROCESSING APPARATUS

The improved processing apparatus comprising the present invention is designed primarily for use in connection with the commercial processing of dog food, particularly small chunk size dog food such as that which is commonly referred to as "-kibbled" food. The invention is, however, capable of other uses and a processing apparatus embodying the principles of the invention may, if desired and with or without modification as required, be employed in connection with the processing of food products which are designed for either animal or human consumption. Irrespective, however, of the particular use to which the invention may be put, the essential features thereof are at all times preserved.

The present invention is specifically concerned with a processing apparatus of the type which employs a perforated extrusion plate, one side of which constitutes a pressure side against which the raw ingredients of the food product are forced by way of a power-driven feed screw so that these ingredients are extruded forwardly through the perforations in the plate, the extrusions being sheared from the plate by a rotary multibladed cutter assembly which is positioned adjacent to the other or discharge side of the extrusion plate and is provided with radial cutter blades that sweep around the opposed face of the extrusion plate and shear the extruded material issuing from the perforations at a distance slightly removed from the discharge side of the extrusion plate. A processing apparatus of this general type relies upon its successful operation upon the principle that by taking the raw food ingredients which usually contain approximately 22 percent moisture and greatly compressing them against the pressure side of the perforated extrusion plate, the extrusions which take place on the discharge side of the extrusion plate expand appreciably before they are sheared by the blades of the rotary cutter assembly. Wear takes place or occurs on the leading edge of each blade of the cutter assembly at the region where the blade engages the expanded extrusions so that after prolonged periods of apparatus use, the blades of the cutter assembly present concavities along their leading edges. As these concavities become deeper, the effective shearing distance from the extrusion plate becomes greater and, as a consequence, the points of shear move away from the extrusion plate so that proper transverse shearing of the extrusions does not occur, these extrusions tending to bend in the direction of shear and break away from the shear plate at points other than the desired shear points. This results in the production of much granular material, as well as in the production of chunks of nonuniform as well as abnormal size. Furthermore, it necessitates frequent shutdowns involving long periods of idle time in order to effect cutter blade adjustments wherein the blades are moved closer to the extrusion plate to compensate for blade wear. Heretofore, these cutter blades have been carried on a rotatable cutter head which is maintained at a fixed distance from the extrusion plate, the cutter blades being individually adjustable in an axial direction with respect to the head. Obviously, in order to effect an adjustment of the blades, it is necessary to terminate the operation of the apparatus and make the adjustment while the cutter head is not in motion. Since equal adjustment of the individual blades of the cutter assembly invariably is required, each adjustment must be a careful and painstaking one and it frequently happens that after the individual adjustments of the blades have been made and the apparatus restored to operation, the adjustments are found to be unequal or otherwise satisfactory as, for example, due to an overall underadjustment or overadjustment. Thus, further experimental adjustments are required. The principal objection to the making of such cutter blade adjustments resides in the amount of idle time which is consumed during the period when the processing apparatus is not in productive operation.

The present invention is designed to overcome the above-noted limitation that is attendant upon the construction and use of a conventional processing apparatus of the particular type under consideration, and toward this end, it contemplates the provision in a food-processing apparatus of means by which cutter blade adjustments may be made while the apparatus is in actual operation to the end that no shutdown periods are necessary and dismantling operations are completely eliminated. The provision of such a food-processing apparatus constitutes the principle object of the invention.

In carrying out this object, the invention contemplates the provision of an apparatus wherein the blades of the rotary cutter assembly are fixedly secured on the cutter head and the latter is initially set so that the leading edges thereof are disposed in a slight predetermined distance away from the discharge side of the perforated extrusion plate. This allows for a subsequent collective adjustment of the blades towards the extrusion plate to compensate for blade wear as previously outlined above. The invention further contemplates a novel means whereby the entire cutter assembly, including the supporting structure for the cutter assembly drive shaft, the drive shaft itself, and the cutter head of the cutter assembly which is mounted on the drive shaft, may be shifted axially and bodily toward the extrusion plate and its supporting structure with vernier-like precision to effect the desired cutter blade and extrusion plate distance adjustment, after which, when the adjustment has been made, the supporting structure for the cutter assembly may be fixedly locked in its adjusted position. Still further, the invention contemplates that this adjustment may be made, as heretofore stated, without stopping the operation of the apparatus or otherwise interrupting its continuous performance.

Numerous other objects and advantages of the invention, not at this time enumerated, will readily suggest themselves as the nature of the invention is better understood from a reading of the following detailed description.

The invention consists in the several novel features which are hereinafter set forth and are more particularly defined by the claims at the conclusion hereof.

In the accompanying two sheets of drawings forming a part of this specification, one illustrative embodiment of the invention is shown.

In these drawings:

FIG. 1 is a fragmentary perspective view of a food-processing installation, showing the improved apparatus operatively disposed in position over a discharge conveyor for the processed food and operatively connected to a power drive mechanism;

FIG. 2 is a top plan view of the food-processing apparatus which is shown in FIG. 1, the discharge conveyor and the power drive mechanism being omitted;

FIG. 3 is a vertical longitudinal sectional view taken on the line 3—3 of FIG. 2;

FIG. 4 is a vertical transverse sectional view taken on the line 4—4 of FIG. 3;

FIG. 5 is a vertical transverse sectional view taken on the line 5—5 of FIG. 3;

FIG. 6 is an enlarged vertical transverse sectional view taken on the line 6—6 of FIG. 3;

FIG. 7 is an enlarged vertical transverse sectional view taken on the line 7—7 of FIG. 1; and FIG. 8 is a fragmentary side view, largely schematic in its representation, illustrating certain phenomena which is encountered in connection with cutter blade wear and compensating adjustment therefor.

Referring now to the drawings in detail and in particular to FIG. 1, an exemplary embodiment of a food-processing apparatus embodying the present invention is designated in its entirety by the reference numeral 10 and it is shown as being operatively associated with a discharge conveyor 12 by means of which the processed food product is conveyed away from the apparatus. The apparatus is powered or driven by an electric motor M which is operatively connected by a belt and pulley arrangement 14 to a gear reduction arrangement (not shown) which is enclosed within a suitable housing 18 and includes an output drive sleeve 20 which projects in a horizontal direction from the housing 18. This drive mechanism which includes the motor M, the housing 18 and the latter's contained gear reduction arrangement, together with the output drive sleeve 20, constitutes no part of the present invention and, therefore, the full details thereof have not been disclosed herein, other drive mechanism for performing the same drive function being capable of substitution therefor if desired. It is deemed sufficient to state that the output drive sleeve 20 is adapted to be connected in driving relationship to the input element of the food processing apparatus 10, all in a manner that will be set forth in detail presently.

The discharge conveyor 12 is merely an adjunct to the processing apparatus 10 and may be of any conventional construction so long as it is capable of transporting the processed food product which is discharged by the processing apparatus to a remote location. In the illustrated form, an elongated troughlike base 30 encloses an endless conveyor belt 32 while a pair of side shields 34 and an end shield 36 overlie the receiving end of the conveyor belt 32 and prevent lateral or longitudinal displacement of the processed food product which is discharged from the processing apparatus 10 into the receiving end of the conveyor.

Still referring to FIG. 1, as well as to the remaining views of the drawings, the processing apparatus 10 involves in its general organization a generally frustoconical food hopper 40, the axis of which extends substantially horizontally, and the large base or end of which is formed with a mating outwardly extending flange 42 which is designed for cooperation with a similar mating outwardly extending flange 44 on the forward end of a feed conduit 46. The latter leads from a suitable mixing cooker or the like which supplies the mixed and precooked food ingredients to the hopper 40. A pair of opposed arcuate clamps 48 of U-shaped cross section serves to hold the flanges 42 and 44 in their operative mating relationship for end-to-end communication between the feed conduit 46 and the hopper 40. Supporting legs, one of which is shown at 50, maintain the conduit and the hopper in their aligned substantially horizontal position.

As best illustrated in FIG. 3 of the drawings, the small discharge end of the frustoconical hopper 40 is provided with a radial outwardly extending flange 52 which mates with a peripheral flange 54 on a circular extrusion plate 56 while a pair of opposed arcuate clamps 58 of U-shaped cross section and similar to the clamps 48 holds the extrusion plate 56 fixedly and tightly against the small discharge end of the hopper 40. A series of perforations or openings 60 is formed in the extrusion plate 56, these openings preferably being equally spaced and circumferentially or annularly arranged as shown in FIG. 5 of the drawings. Although six such openings 60 are illustrated in FIG. 5, it is to be understood that a greater or lesser number of openings may be employed and that the radial disposition thereof from the center of the extrusion plate may be varied if desired. A rotatable forwardly tapered pressurizing feed screw 62 is disposed in coaxial relationship within the hopper 40 and the forward end thereof terminates a short distance rearwards of the inner or pressure side of the extrusion plate 56. An involute helical feed vane 64 on the feed screw serves to impel the food ingredients within the hopper forwardly and progressively pressurize the same so that an extremely high internal pressure is attained in the forward region of the hopper. An annular series of internal ribs 65 is connected to and extends along the inner surface of the sidewall of the hopper 40 and prevents bulk rotation of the food ingredients undergoing feeding against the extrusion plate 56 by the feed screw.

While the invention is not limited to the processing of any particular food ingredient, an exemplary product or comestible suitable for dog or other animal consumption may consist of a mixture of meat meal, ground corn, soy bean meal, dried whey products, animal fat, bone or feather meal, yeast salt and other flavorings, the mixture being steam-cooked and fed to the hopper 40 in a heated condition and with the water content thereof at approximately 22 percent. Obviously, many other mixtures are acceptable for use as animal food and are capable of being processed by the apparatus of the present invention.

The hopper 40 serves as a support for an elongated horizontally extending base frame 66. The latter consists of two spaced-apart hollow side members 68 (see FIG. 4) which are of rectangular cross section and have their front ends connected together by a transverse end member 70 which closes the forward ends of both side members. The rear ends of the side members 68 are closed by attachment plates 72 which overhang the inner side of said side members and have their inner edges welded as indicated at 74 (see FIG. 2) to a medial region of the hopper 40. Additional strut plates 76 (see FIG. 7) are disposed on opposite sides of the hopper 40 and are welded to both the hopper and the side members 68 of the base frame 66.

The base frame 66 carries thereon a movable carriage which is designated in its entirety by the reference numeral 80 and in the main is in the form of a flat rectangular horizontal plate 81 which overlies and bridges the distance between the two side members 68 of the base frame 66 and is disposed forwards of the hopper 40. This carriage is capable of limited horizontal sliding movement in a fore and aft longitudinal direction and in a manner and for a purpose that will be made clear presently.

Two horizontally extending, spaced-apart guide rails 82 are mounted on the forward regions of the side members 66 of the base frame are held in position thereon by screws 83 and have formed therein longitudinally extending dovetail guideways 84 for sliding reception of a pair of dovetail guide bars 86 (see FIG. 4), the latter being secured to the underneath side of the carriage plate 81 by additional screws 88. Two locking or set screws 90 (see FIG. 3) pass through holes 92 in the carriage plate 81 and are threadedly received in bores 94 in the guide bars 86. Upon tightening of the screws 90, the sloping sides of the guide bars 86 are drawn upwardly against the sloping sides of the guideways 84, thus locking the carriage as a whole in any desired position of longitudinal adjustment and also against shifting. Lock nuts 96 in associated relation with the screws 90 maintain the latter in their tightened positions.

As best shown or illustrated in FIGS. 2 and 3, the carriage plate 81 serves to support a rotatable underslung longitudinally extending cutter-supporting shaft 100, the latter being suspended in a pair of spaced-apart bearing supports 102 which are secured by bolts 104 to, and depend from, a pair of spacer blocks 106. The latter, in turn, are welded or otherwise secured to the underneath side of the carriage plate 81. Collars 108 which are mounted on the shaft 100 on opposite sides of the bearing supports 102 prevent axial shifting of the shaft with respect to these supports and, consequently, with respect to the carriage 80 as a whole.

The distal end of the cutter-supporting shaft 100 is connected by a universal coupling 109 (see FIGS. 1 and 2) to an adapter shaft 110 which has fixedly mounted thereon an enlarged head 111 (see FIG. 7), the latter being slidable within the drive sleeve 20 and being constrained to rotate with the latter by means of a spline connection 112. By way of such connection, together with the parts that are associated therewith, the cutter-supporting shaft 100 is permitted to slide to and from the drive sleeve 20 while at the same time maintaining its driving relation therewith.

The end of the shaft 100 which is adjacent to the extrusion plate 56 carries a cutter assembly 113, the details of which appear in FIGS. 3 and 5. This cutter assembly embodies a hub 114 which is in the form of a cylindrical enlargement of the shaft 100. The hub is formed with a series of three longitudinally extending, equidistantly spaced slots 115 (see FIG. 6) within which there are secured by means of screws 116 respective cutter arms 118. The arms 118 overhang the proximate end of the hub 114 and have welded or otherwise fixedly secured thereto respective cutter or knife blades 120, the latter being in the form of substantially flat rectangular steel plates the respective planes of the blades 120 extending at an angle of approximately 45° with respect to the plane of the extrusion plate 56 and are provided with straight shearing edges 122 which, where new or unused blades are concerned, normally are spaced from the extrusion plate 56 by a distance on the order of three-eighths of an inch.

As previously stated, the carriage 80, together with the cutter-supporting shaft 100 and its associated cutter assembly 113, is capable of limited longitudinal shifting movement toward and away from the general plane of the extrusion plate 56, such shifting movement being for the purpose of compensating for wear of the knife blades 120. Accordingly, to effect such sliding movement and thus regulate the longitudinal position of the cutter assembly 113, a fixed reaction bar 130 overlies the carriage 80 and is provided with downturned ends 132 the inner edges of which are welded as at 134 to the outer sides of the rectangular tubular side members 68 of the base frame 66. A thrust block 136 projects upwards from and is suitably secured as by welding to the upper face of the carriage plate 81 and fixedly receives therein a horizontal screw 138 which projects longitudinally from one side of the thrust block 136 and passes through an opening 140 in the central portion of the reaction bar 130. Two clamping nuts 141 and 142, one on each side of the reaction bar, are threadedly received on the screw 138 and facilitate adjustment of the position of the cutter-supporting carriage 80 in a manner that will be described when the operation of the food-processing apparatus 10 is set forth.

Before entering into a description of the operation of the herein described food-processing apparatus 10, it is pointed out that with the present apparatus, as well as with conventional food-processing apparatuses for the same purpose and of the same general type wherein the product is pressurized within a hopper and forced through openings in an extrusion plate to produce extrusions which are severed forwardly of the plate by rotary knife blades which are maintained slightly spaced from the plate, since only a limited extend of the shearing edges of the knife blades traverse the extrusion openings in the extrusion plate, after a period of time and due to repeated contact of the product with limited regions of the shearing edges, small recesses or concavities are created in these edges. When the depth of these concavities reach a predetermined maximum, proper shearing is prevented and it is necessary to adjust the position of the blades 120 by moving them closer to the extrusion plate, thus compensating for the wear which has taken place. The initial clearance which is provided between the blades 120 and the extrusion plate is present for the express purpose of permitting such adjustment of the blades since, without it, no rearward movement of the blades could be made. Heretofore, because it has been the practice to maintain the distance between the hub of the cutter assembly and the extrusion plate fixed and to provide for individual adjustment of the blades with respect to the cutter hub, it has been necessary to shut down the apparatus while the adjustments are being made. According to the present invention, the provision of a longitudinally adjustable cutter-supporting carriage, such as the aforementioned carriage 80, enables a collective and simultaneous adjustment of the knife blades 120 toward the extrusion plate without terminating the operation of the apparatus which may continue to produce the processed food product during the time that the adjustment is being made.

Considering now the operation of the food-processing apparatus 10, and assuming for purposes of discussion that fresh or new knife blades 120, together with their associated cutter arms 118, are installed in the apparatus, the carriage 80 will be adjusted so that the shearing edges 122 of these blades are disposed a slight distance from the front face of the extrusion plate 56. The particular distance selected for this initial adjustment may be varied within prescribed limits, depending upon the consistency of the product undergoing processing and the desired size and shape of the piece. of the processed food product. For a product which is comprised of the aforementioned ingredients with an aqueous content of approximately 22 percent, it has been found that a spacing between the knife blades 120 and the extrusion plate 56, which is on the order of three-eighths of an inch, will produce satisfactory processing of the product. Upon rotation of the pressurizing feed screw 62, the material in the forward region of the hopper casing 40 will be subjected to extremely high internal pressure which is adequate to extrude the material forwardly through the openings 60 in the extrusion plate so that it issues in the form of solid self-supporting extrusions on the discharge side of the extrusion plate and immediately expands to several times its pressurized volume. These extrusions, although expanded, possess sufficient rigidity that they are capable of being sliced or sheared by the blades 120 at a small distance from the extrusion plate despite the fact that these blades do not make direct contact with the extrusion plate. As the knife blades sweep around their circular path of movement, small chunks of the extruded material are severed therefrom and fall by gravity onto the receiving end of the underlying conveyor 32 which conveys them to a suitable packaging station at a remote location. The initial spacing of the knife blades 120 from the forward or discharge side of the extrusion plate 56 has been schematically illustrated in FIG. 8, wherein this spacing has been indicated by the dimension "a."

After a period of time, the linear regions (shearing edges 122) of the cutter blades which actually engage the aforementioned expanded extrusions become worn, thus producing an arcuate cavity which is shown in full lines in FIG. 8 and is designated by the reference letter w. These worn portions of the shearing edges 122 of the knife blades 120 will continue to effect satisfactory shearing of the product until such time as the depth of the cavities reaches a predetermined maximum dimension such as has been indicated at "b." At this time, it becomes necessary to effect an adjustment of the carriage 80 towards the extrusion plate 56.

To effect the aforementioned adjustment, it is merely necessary first to loosen the screws 90 after loosening of their respective lock nuts 96 and then to loosen the nut 142 (see FIG. 3) on the screw 138 and thereby shift the position thereof a small distance away from the hopper 40 and the extrusion plate 56, after which the other nut 141 may be tightened against the reaction bar 136, this tightening operation serving to place the screw 138 under tension and pull the same towards the hopper, thus drawing the entire carriage 80 in the direction of the extrusion plate 56. During such movement of the carriage, the cutter-supporting shaft 100 and, consequently, the cutter assembly 113, is shifted toward the extrusion plate 56 a distance conformable with the initial extent of displacement of the nut 141 from the reaction bar 130. With the particular pitch of the threads on the screw being known by the operator, the number of turns of the nut 142 when loosening the same may be readily ascertained to effect any desired degree of longitudinal adjustment of the carriage 80, and consequently, of the blades 120. After the adjustment has been completed, the locking screws 90 are tightened and secured in their locking condition by tightening the lock nuts 96 that are associated therewith.

In FIG. 8, an adjustment for maximum cavity depth or wear of the shearing edges 122 of the blades 120 is indicated by the dotted line position of the one illustrated blade. The extent of this adjustment is represented by the dimension "b." Thus, in the new position of the rotating knife blades 120 which continue their rotation during the performance of the adjustment, the general location of the shearing edges afforded by the cavities w is substantially the same as the location of the linearly straight shearing edges 122 of the various blades 120 when these blades were initially installed on the hub 114 of the cutter assembly 113. With the blades 120 thus positioned, continued shearing of the extruded product issuing from the various openings 60 in the extrusion plate 56 will, in time, cause the cavities w to be gradually further deepened until such time as the full depth thereof brings the bottoms of these cavities in the originally unadjusted knife blades. At this time, the dimension of cavity depth will be the sum of the dimensions "a" plus "b." Since at this time the unworn shearing edges 122 of the blades 120 are substantially in contact with the extrusion plate 56, no further adjustment of the carriage 80 can be resorted to and blade renewal is required. Meanwhile, however, the cutting life of the blades 120 has been substantially doubled without shutting down the food-processing apparatus 10.

It is to be distinctly understood that the schematic illustration of FIG. 8 and the description made herein in connection with this view are predicated upon allowing the knife blades 120 of the cutter assembly 113 to function uninterruptedly so that maximum cavity depth is attained before a carriage adjustment is made. In such an instance, a full carriage adjustment may be made on a one-adjustment basis and the apparatus caused to continue its operation until the knife blades 120 have become worn beyond further usefulness. However, in actual practice, it may be considered desirable to effect an early adjustment of the carriage for minor cutter blade wear and, thereafter, to make repeated adjustments from time to time until the aforementioned maximum cavity depth has been attained. By so doing, the average or mean-shearing plane is maintained closer to the shear plate than when a single adjustment is made at the time when one-half of the cutter blade life has been consumed.

The invention is not to be limited to the exact arrangement of parts shown in the accompanying drawings or described in this specification as various changes in the details of construction may be resorted to without departing from the spirit or scope of the invention.

Having thus described the invention what we claim as new and desire to secure by letters patent is:

1. In a food-processing apparatus for converting a moist comestible into chunks, in combination, a hopper for receiving the comestible, means disposed within the hopper for pressurizing the comestible contained therein, a vertically disposed extrusion plate against which the pressurized comestible in the hopper bears, said extrusion plate being formed with a series of openings therein through which the pressurized comestible passes forwardly under the influence of internal pressure therein to produce solid self-supporting extrusions which project forwardly from the extrusion plate, a rotary cutter hub positioned forwardly of the extrusion plate and rotatable about an axis normal to the extrusion plate, a series of blades on said hub and having shearing edges which, upon rotation of the cutter head, sweep around the forward face of the plate a slight distance forwardly of the latter and sever the projecting extrusions a slight distance forwardly of the extrusion plate, means for rotating said cutter hub, said extrusion plate and cutter hub being relatively movable toward and away from each other, and means for effecting relative movement between the extrusion plate and the cutter hub to decrease the effective distance therebetween to compensate for blade wear.

2. In a food-processing apparatus for converting a moist comestible into chunks, the combination set forth in claim 1 and wherein the apparatus embodies a framework to which the hopper and its associated extrusion plate are fixedly secured, the rotary cutter hub is mounted on and movable bodily with a carriage which is slidable on said framework, and the means for effecting relative movement between the extrusion plate and the cutter hub comprises a screw fixedly mounted on the carriage and a rotatable member threadedly received on said screw and engageable with a fixed reaction member on the framework for placing the screw under tension to thus draw the carriage toward said extrusion plate.

3. In a food-processing apparatus, the combination set forth in claim 2 and including, additionally, releasable locking means effective between the carriage and the framework for anchoring the former in selected positions on the latter.

4. In a food-processing apparatus for converting a moist comestible into chunks, in combination, a hopper for receiving said comestible and including a horizontally disposed tubular casing, a perforated extrusion plate extending across the forward end of the casing, means within said casing for pressurizing the comestible which is contained within the hopper thereby to force the same forwardly through the openings in the extrusion plate and produce solid self-supporting extrusions which project forwardly from the plate, a frame fixedly secured to said casing and projecting forwardly of the extrusion plate, a carriage slidable on said frame forwardly of the extrusion plate and movable toward and away from the latter, a cutter hub mounted on said carriage for rotation about a horizontal axis normal to the extrusion plate, a series of knife blades mounted on said hub and having shearing edges which are adapted, upon rotation of the hub, to sweep around the forward face of the plate and sever the projecting extrusions a slight distance forwardly of the plate, a reaction member fixedly mounted on the frame, a thrust member secured to the carriage, and a screw extending between said members and effective under tension and compression to produce sliding movements of the carriage in opposite directions respectively.

5. In a food-processing apparatus, the combination set forth in claim 4 and wherein said screw is fixedly secured to one of said members and projects through the other member, and a pair of adjustable clamping nuts threadedly received on said screw on opposite sides of said other member.

6. In a food-processing apparatus, the combination set forth in claim 4 and wherein said screw is fixedly secured to said thrust member on the carriage and projects through the reaction member on the frame.

7. In a food-processing apparatus, the combination set forth in claim 5 and including, additionally, clamping means effective between the carriage and frame for clamping the former in selected positions of adjustment on the latter.

8. In a food-processing apparatus, the combination set forth in claim 7 and wherein said clamping means comprises a set screw movable bodily with the carriage and engageable with the frame upon tightening of the screw.

9. In a food-processing apparatus, the combination set forth in claim 4 and including, additionally, a horizontal drive shaft on which said cutter hub is mounted, a bearing support mounted on the carriage and through which the drive shaft projects, and interengaging means on the bearing support and the drive shaft constraining the latter to follow the movements of the former upon shifting movements of the carriage on the frame.

10. In a food-processing apparatus, the combination set forth in claim 9 and wherein said interengaging means embodies a pair of collars secured to the drive shaft on opposite sides of the bearing support and effective upon shifting movement of the carriage on the frame to produce axial shifting movement of the drive shaft, and consequently, of the cutter hub, relatively to the extrusion plate.

11. In a food-processing apparatus, the combination set forth in claim 9 and wherein said cutter hub is in the form of an enlargement on the rear end of the drive shaft, the hub is provided with a series of slots therein which project radially inwardly of the hub from the outer periphery thereof, and the blades are mounted on cutter arms which are removably secured in said slots.

* * * * *